W. LEVY.
TRACTION LUG.
APPLICATION FILED FEB. 18, 1922.
1,423,568.
Patented July 25, 1922.
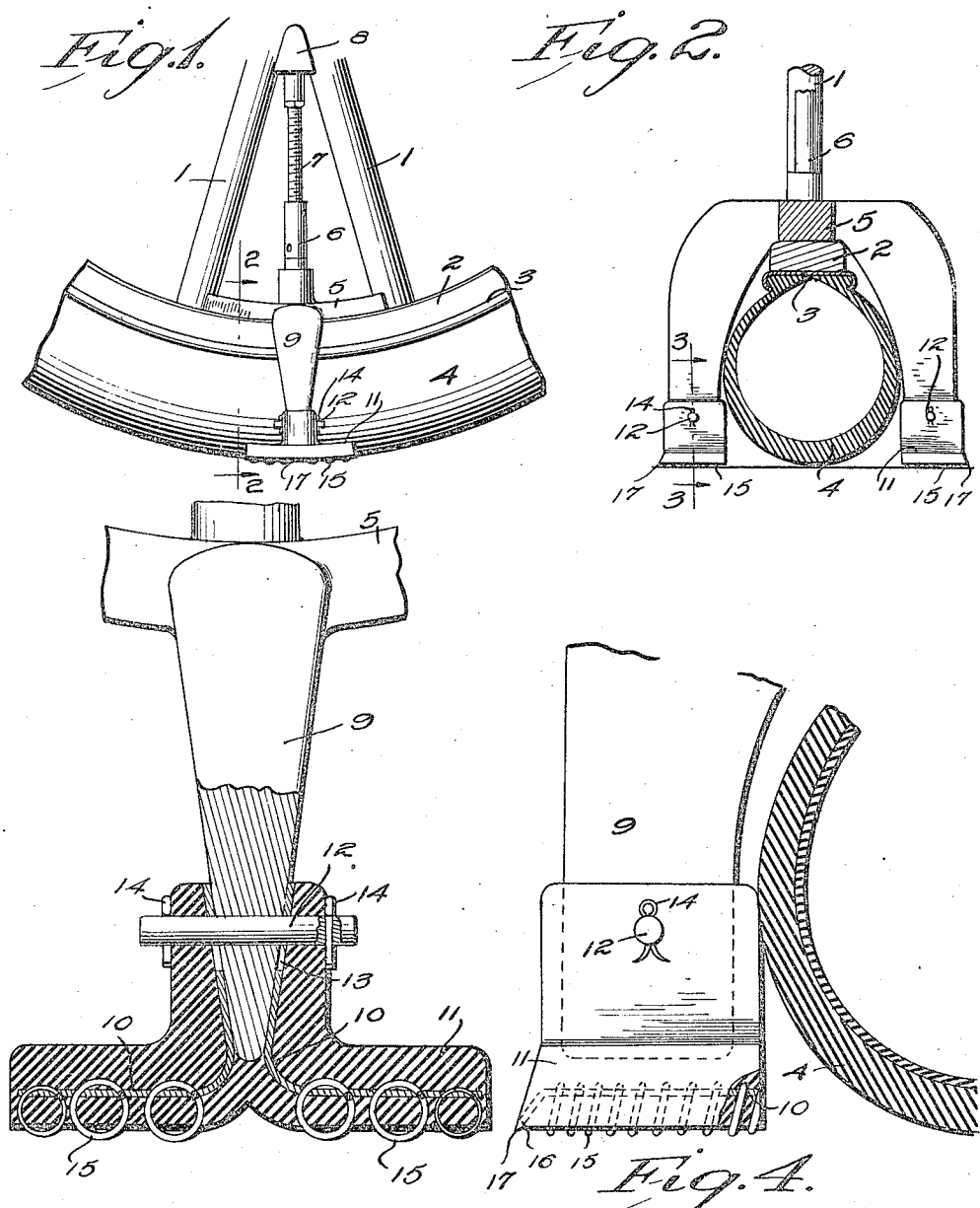
Inventor
WILLIAM LEVY

UNITED STATES PATENT OFFICE.

WILLIAM LEVY, OF PATERSON, NEW JERSEY.

TRACTION LUG.

1,423,568.     Specification of Letters Patent.     Patented July 25, 1922.

Application filed February 18, 1922. Serial No. 537,626.

*To all whom it may concern:*

Be it known that I, WILLIAM LEVY, a citizen of the United States, residing at Paterson, in the county of Passaic and State of New Jersey, have invented certain new and useful Improvements in Traction Lugs, of which the following is a specification.

This invention relates to traction lugs, and is an improvement over the construction disclosed and claimed in my Patent No. 1,403,610, granted January 17, 1922.

In the said patent, I have disclosed and claimed a traction lug consisting of a supporting member adapted to be arranged on the inner side of the felly of a wheel, having lugs attached thereto, extending downwardly on the opposite sides of the tire.

In the present invention, I provide engaging members adapted to be secured to the lower end of said lugs. These engaging members are formed of sheet steel frames which are secured to the lugs adjacent their lower ends and which are provided with relatively large engaging surfaces. The frames are covered with rubber or similar material, and suitable springs are embedded therein and project from the engaging face. By means of the construction described, a surface engaging member is formed in which the frame of the engaging member will give slightly when the vehicle wheel skids and the springs projecting from the engaging face will effectually prevent further skidding.

In the accompanying drawings, I have shown one embodiment of the invention. In this showing:

Figure 1 is a side elevation of a portion of a wheel showing the invention applied, Figure 2 is a transverse vertical sectional view on line 2—2 of Figure 1, Figure 3 is a vertical longitudinal sectional view on line 3—3 of Figure 2, and, Figure 4 is a detail view of the parts shown in Figure 2 on an enlarged scale.

Referring to the drawings, the reference numeral 1 designates the spokes of a wheel, which is provided with the usual felly 2 and tire rim 3. A pneumatic tire casing 4 is shown in position on the rim. The traction lug consists of a plate 5 adapted to be arranged on the inner side of the felly having a sleeve 6 secured thereto. This sleeve receives a threaded rod 7, the upper end of which is provided with a triangular head adapted to be received between the spokes of a wheel. The plate 5 is provided with lugs 9 at each side projecting downwardly adjacent the sides of the tire casing (see Figure 2).

The engaging member comprises a frame formed of two pieces 10 of sheet steel which are covered with rubber or other similar material, as indicated at 11. The frame members are spaced from each other to receive the lower end of the lug. The lug is provided with an opening adapted to receive a pin 12, passing through elongated slots 13 in the frame members and through openings in the rubber covering. This pin is retained in place by suitable means, such as cotter pins 14. A plurality of transversely extending spiral springs 15 are arranged in the lower portion of the frame and project outwardly through the rubber covering. The sides of the frame at the lower end are extended downwardly, as at 16, and provided with a sharpened surface 17, which is disposed substantially in the plane of the outer face of the rubber covering.

In operation, the traction member is applied by placing the rod 7 and the sleeve 6 between a pair of spokes, and the rod 7 extended until the head 8 firmly engages the hub and the inner ends of the adjacent spokes. The broad traction surface provided by the sheet metal frame and rubber covering permits a vehicle to be run over roads where a vehicle merely provided with the ordinary tire would be unable to obtain traction. The device also serves as an antiskidding device, as the sheet metal frame gives slightly when the vehicle starts to skid, the rubber covering being drawn toward the tire and the sharpened point 17 gripping the surface of the rod and stopping the skidding. Any number of traction lugs may be employed, each of the lugs being independently mounted and being capable of independent removal.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An attachment for vehicle wheels comprising a plate adapted to be arranged on the inside of the felly, lugs carried by said plate and projecting downwardly, and traction members yieldingly secured to the lower ends of said lugs, said traction members being provided with substantially flat engaging surfaces.

2. An attachment for vehicle wheels comprising plate adapted to be arranged on the inside of the felly, lugs carried by said plate and projecting downwardly, and traction members secured to the lower ends of said lugs, each of said traction members comprising a frame of substantially rigid material and a covering of rubber forming a substantially flat yielding traction surface.

3. An attachment for vehicle wheels comprising a plate adapted to be arranged on the inside of the felly, lugs carried by said plate and projecting downwardly, and traction members secured to the lower ends of said lugs, each of said traction members comprising a frame of substantially rigid material, a covering of rubber forming a substantially flat yielding traction surface, and a plurality of coil springs secured to said frame and projecting from said traction surface.

4. An attachment for vehicle wheels comprising a plate adapted to be arranged on the inside of the felly, lugs carried by said plate and projecting downwardly, and traction members secured to the lower ends of said lugs, each of said traction members comprising a frame of substantially rigid material, a covering of rubber forming a substantially flat yielding traction surface, and a plurality of coil springs secured to said frame and projecting from said traction surface, the outer edge of said frame being extended downwardly and sharpened to form an anti-skidding element.

5. An attachment for vehicle wheels comprising a substantially radial lug secured to the wheel at one side thereof, said lug being tapered to decrease in thickness outwardly of the wheel, a pair of traction members each having a portion engaging one of the tapered sides of said lug, and yielding means for connecting said traction member to said lug.

6. An attachment for vehicle wheels comprising a substantially radial lug secured to the wheel at one side thereof, said lug being tapered to decrease in thickness outwardly of the wheel and being provided with an opening, a pin mounted in said opening, and a pair of traction members each having a portion engaging one of the tapered sides of said lug, the lug engaging portions of said traction members being provided with slots arranged substantially radially of the wheel and adapted to receive the ends of said pin.

In testimony whereof I affix my signature in presence of two witnesses.

WILLIAM LEVY.

Witnesses:
WILLIAM M. FANNING,
RACHEL STEELES.